US012795049B2

(12) United States Patent
Gasparri et al.

(10) Patent No.: US 12,795,049 B2
(45) Date of Patent: Nov. 10, 2026

(54) SYSTEMS AND METHODS FOR GENERATING AND DISPLAYING VISUAL OBJECTS IN WEB CONFERENCING APPLICATIONS

(71) Applicant: Kr8 Ventures LLC, Los Angeles, CA (US)

(72) Inventors: Massimiliano Gasparri, Los Angeles, CA (US); Margeaux Shavone Randolph, Gonzales, LA (US); Fabio Italiano, Brooklyn, NY (US)

( * ) Notice: Subject to any disclaimer, the term of this patent is extended or adjusted under 35 U.S.C. 154(b) by 72 days.

(21) Appl. No.: 18/633,499

(22) Filed: Apr. 11, 2024

(65) Prior Publication Data

US 2025/0047813 A1 Feb. 6, 2025

Related U.S. Application Data

(60) Provisional application No. 63/458,650, filed on Apr. 11, 2023, provisional application No. 63/458,649, filed on Apr. 11, 2023.

(51) Int. Cl.
*H04N 7/15* (2006.01)
*G06T 5/50* (2006.01)

(52) U.S. Cl.
CPC ............... *H04N 7/157* (2013.01); *G06T 5/50* (2013.01); *G06T 2207/20221* (2013.01)

(58) Field of Classification Search
CPC . H04N 7/157; H04N 7/15; G06T 5/50; G06T 2207/20221; G06T 11/00; G06T 19/00; G06T 2219/024; G06F 3/0481; G06F 3/0486; G06F 3/11; G06F 9/45545; H04L 67/303; H04L 12/1822; H04L 12/1827;
(Continued)

(56) References Cited

U.S. PATENT DOCUMENTS 11,593,989 B1 * 2/2023 Krol .................... H04L 12/1827
2011/0271192 A1 * 11/2011 Jones .................... G06F 3/0421 709/227

(Continued)

FOREIGN PATENT DOCUMENTS

WO WO-2011136786 A1 * 11/2011 ........... G06Q 10/101
WO WO-2022087147 A1 * 4/2022 ............ H04M 3/568

*Primary Examiner* — Yogeshkumar Patel

(74) *Attorney, Agent, or Firm* — Davison IP; Scott H. Davison

(57) ABSTRACT

A user-based visual object generation system is provided which generates and displays user-based visual objects in a live stream during a web conferencing session. One or more visual objects may be generated based on the user's characteristics such as user settings and attributes, topics, content, and subjects discussed in the web conferencing session. A background image (whether real or virtual) used during the web conferencing session may also be analyzed to determine which visual objects to add to the background image and determine a location for placement of the visual objects. The visual objects are then dynamically composited into the video stream background image for displaying on the participants' electronic devices. The system further analyzes the display of the visual objects to track impressions, interactions, duration and other information to determine the effectiveness of the visual objects in relation to the meeting hosts and participants to improve the system.

14 Claims, 16 Drawing Sheets

(58) Field of Classification Search
CPC ............. H04L 65/4038; H04L 65/4046; H04L 65/1069
See application file for complete search history.

(56) References Cited

U.S. PATENT DOCUMENTS

| | | | | |
|---|---|---|---|---|
| 2021/0390953 | A1* | 12/2021 | Makker | G06F 3/0304 |
| 2022/0070238 | A1* | 3/2022 | Yerli | G06F 3/011 |
| 2023/0126108 | A1* | 4/2023 | Roper | H04N 7/147<br>348/14.08 |
| 2023/0299988 | A1* | 9/2023 | Jin | G06F 3/04842<br>715/753 |
| 2024/0022688 | A1* | 1/2024 | Copley | H04N 7/147 |

* cited by examiner

SYSTEMS AND METHODS FOR GENERATING AND DISPLAYING VISUAL OBJECTS IN WEB CONFERENCING APPLICATIONS

REFERENCE TO RELATED APPLICATIONS

This application claims the benefit of priority to U.S. Provisional Patent Application No. 63/458,649, filed Apr. 11, 2023, and U.S. Provisional Patent Application No. 63/458,650, filed Apr. 11, 2023, the contents of which are incorporated herein in their entirety.

BACKGROUND OF THE INVENTION

Field of the Invention

The invention relates generally to the field of web conferencing, and more specifically to systems and methods for generating and inserting visual objects into a live stream of a web conference.

Description of the Related Art

Web conferencing includes various types of online conferencing and collaborative services including webinars (web seminars), webcasts, and web meetings. In general, web conferencing is made possible by Internet technologies, particularly on TCP/IP connections. Services may allow real-time point-to-point communications as well as multicast communications from one sender to many receivers. It offers data streams of text-based messages, voice and video chat to be shared simultaneously, across geographically dispersed locations. Applications for web conferencing include meetings, training events, lectures, or presentations from a web-connected computer to other web-connected computers.

Web conferencing software enables participants to host live video meetings via the internet on TCP/IP connections. In a web conferencing session, participants may also deliver presentations and trainings, as well as host social gatherings. Once a participant joins a session, their information may be displayed as a video stream, as an image, as a "guest" name, as a phone number, or as a logged in user. Participants are able to share their computer screen, showing images or documents to their audiences. In addition, participants may upload an image to use as a "virtual background" to display as a backdrop in a session, or to replace their video stream. Participants access audio via a telephone connection or via computer microphones and speakers in a web conference session.

Web conferencing software may be run as a web browser application, or as a local software application that a participant must download or install on their computer.

Participants can connect to a web conference by phone, desktop computer, desktop software application or via a mobile app. Most web conferencing platforms include one or more web conferencing servers through which each participant connects to a web conferencing session. Most web conferencing platforms can host up to 100 participants; a select number of platforms can host up to 1,000 participants per session. Some web conferencing platforms allow for the use of virtual cameras. A virtual camera is a software application that allows users to create an overlay of video and images, which the participant can use to stream a live web conference video in place of a standard webcam.

Improvements are still needed to allow for further modifications and user-based customizations to the virtual backgrounds and other images used in a web conferencing session. The present invention satisfies this need, as well as other needs as discussed below.

SUMMARY OF THE INVENTION

Embodiments described herein include systems and methods for generating and displaying user-based visual objects in a live stream during a web conferencing session by first generating one or more visual objects based on the user's characteristics such as user settings and attributes, topics, content, and subjects discussed in the web conferencing session, then analyzing the background image (whether real or virtual) used during the web conferencing session to further determine which visual objects to add to the background image and the location for placement of the visual objects. The systems and methods then dynamically composite the one or more visual objects into the video stream background of the web conference participant for displaying to the participants on their electronic devices. The system may further analyze the display of the visual objects to track impressions, interactions, duration and other information to determine the effectiveness of the types and locations of the visual objects in relation to the meeting hosts and participants, which can then be used to improve the system and provide incentives to visual object owners and meeting hosts.

An exemplary embodiment of the present invention is a dynamic message, or a creative copy, or a visual representation of a product or brand displayed as an object blended in the participant's video stream background, or as an object blended in a virtual background that is composited as a replacement of the participant's video stream background, or in place of the participant's video stream completely.

In one embodiment, the invention is a system that may reside on one or more computers or devices running web conferencing software, as well as on system servers which communicate with host devices and client devices.

In other, more detailed features of the invention, the visual objects are stored on the system servers. Visual objects can be added to the system by individuals, organizations, companies, ad agencies, etc. (visual object owners) that sign up for a membership to the system. The membership includes a description of the visual object owner (which may be separate from the "meeting hosts" or "Ambassadors" referred to below) and their requirements for who (i.e., an "Ambassador" or "Meeting Participant") and how their visual objects are displayed. The requirements include information like Ambassador Attributes restrictions; whether the visual object can be modified in color, shape or size; displayed on a virtual background and/or the Ambassador's live background; etc.

In other, more detailed features of the invention, the visual objects are added to the system along with the information of the elements such as a description, duration for non-static objects, Ambassador Attributes restrictions whether the visual object can be modified in color, shape or size; displayed on a virtual background and/or the Ambassador's live background; etc.

In other, more detailed features of the invention, users can also sign up for the service as Ambassadors. When Ambassadors participate in a web conferencing session they can activate the invention software and select a specific visual object that is available to be displayed in their video stream, or allow the system to select a visual object. The visual objects available to the Ambassador are based on matching the Ambassador's Attributes and preferences with the visual object owner's requirements.

In other, more detailed features of the invention, when Ambassadors sign up they provide information like age, gender, and interests. The system also collects additional information about the ambassador like the number of web conferencing sessions they have attended, the durations of those sessions and number of participants. The collection of this information (age, gender, interests, number of web conferencing sessions, durations and number of participants) is referred to as the Ambassador's Attributes.

In other, more detailed features of the invention, the visual objects that are made available to each Ambassador are based on whether the Ambassador's Attributes match the visual object owner's requirements.

In other, more detailed features of the invention, an Ambassador can also have one or more people in the same physical environment participating in the session using the same web conferencing device. For example, a group of people in a conference room, an office, a house room, etc. may be participating in a web conferencing session.

In other, more detailed features of the invention, the visual object is a message, or a creative copy, or a visual representation of a product or service or brand.

In other, more detailed features of the invention, a visual representation of the visual object may include a video, an animation, a set of digital images (GIFs), a single digital image, a QR code, 2-dimensional SVGs or 3-dimensional digital objects.

In other, more detailed features of the invention, when the system is integrated directly with the web conferencing system, visual objects metadata can be transferred to the web conferencing server.

In other, more detailed features of the invention, the visual object metadata can contain interactive actions. The interactive actions describe the object behavior and the results when the user can take an action on that object. For example, the object can contain a universal resource locator (URL) pointing to a website that contains details about the visual object. When a participant clicks on the visual object the web conferencing client opens a web browser window with the URL associated with the object.

In other, more detailed features of the invention, the software will record a sample of the Ambassador's live video stream and separate the foreground representing the Ambassador image and from the background. The invention will then extract the prominent color and luminosity map of the background that will then be used by the Blending software component in order to modify the visual objects and adapt them to the background.

In other, more detailed features of the invention, in order to extract the foreground image (the Ambassador) and generate the background image, the software will use the background subtraction method, a technique for extracting moving objects from background static images in videos.

In other, more detailed features of the invention, the software will analyze the background image captured from the live video stream or the virtual background and create a 3D map. The software will then select an area in the 3D space where the visual elements of the visual object can be rendered. The visual elements of the selected visual object can be modified in size and color to blend into the area in the 3D space.

In other, more detailed features of the invention, the virtual camera software uses the visual object with or without the Ambassador's live video stream and create a new video stream passing it to the operating system of the device on which the web conferencing software runs on and makes itself available to the web conferencing software as one of the video cameras. The Ambassador selects the virtual camera in the web conferencing software that will display and stream the newly created video stream with the promo.

In other, more detailed features of the invention, the system provides the ability to serve the modified video stream with composited visual elements to the virtual camera software that works with any new and existing web conference systems.

In other, more detailed features of the invention, the system utilizes audio analysis to determine the conversation subject in the web conferencing session. The system then selects the visual objects that match the conversation subject. The system also uses the conversation subject for retargeting with follow up messages after the web conference session is over.

Visual Objects are Blended in the Virtual Background

In other, more detailed features of the invention, the visual elements of the selected visual object will be modified in size and color to blend into the selected virtual background that will replace the Ambassador's video stream background by compositing it behind the image of the Ambassador.

An exemplary method according to the invention is a 3-dimensional digital object representing the visual object that is rendered in the selected virtual background (e.g. placing the object on top of a table).

An exemplary method according to the invention is a digital image of the visual object that is rendered in the virtual background (e.g. in a picture frame on the wall).

An exemplary method according to the invention is a digital image of the visual object that is rendered as a book in the virtual background (e.g. bookshelf).

In other, more detailed features of the invention, the visual elements of the selected visual object include an entire virtual background that will replace the Ambassador's video stream background by compositing it behind the image of the Ambassador.

An exemplary method according to the invention is a background image of a kitchen with an appliance as a product being promoted.

An exemplary method according to the invention is a background image of a living room with a TV set as a product being promoted.

An exemplary method according to the invention is a poster of a car as the visual object that is displayed in a poster hung on the wall of an office room and it becomes the entire background image.

An exemplary method according to the invention is an exercise equipment as the visual object that is displayed in a room of a house and it becomes the entire background image.

Visual Objects are Blended in the Ambassador's Background

In other, more detailed features of the invention, the visual elements of the selected visual object will be modified in size and color to blend into the Ambassador's video stream background.

An exemplary method according to the invention is digitally compositing visual elements of the selected visual object on the wall of the Ambassador's background as a picture frame.

An exemplary method according to the invention is rendering a 3-dimensional object of a can of soda on top of a table in the Ambassador's background.

Visual Objects Replace the Ambassador's Video Stream in its Entirety

In other, more detailed features of the invention, the visual elements of the selected visual object will be modified in size and color to blend into the virtual background that will replace the Ambassador's video stream in its entirety.

Fraud Detection

In other, more detailed features of the invention, the system provides an Artificial Intelligence (AI) fraud detection system to identify and remove from the system Ambassadors with suspicious meeting attendee patterns.

In other, more detailed features of the invention, the system provides anti-fraud mechanisms, including, but not limited to, anomaly detection. The system also allows caps to be set on payments based on frequency and meeting duration.

Brand Safety and Ambassador Requirements

In other, more detailed features of the invention, for brand safety purposes, the system provides a background check to certify ambassadors before displaying visual objects from advertisers and ad agencies.

In other, more detailed features of the invention, the system provides different tiers of membership or service levels based on criteria such as market capitalization, company size, brand equity. The system allows visual object owners to control the display of their visual objects concurrently with visual objects from certain tiers and/or categories, further safeguarding the brand safety.

In other, more detailed features of the invention, the system provides the ability to automatically match visual object owners and Ambassadors based on the advertisers' requirements and preferences and the Ambassadors' attributes and preferences. Ambassadors can pre-filter visual object owners based on a set of criteria and preferences, including, but not limited to, whitelisting and or blacklisting visual object owners or industries. The invention allows visual object owners to pre-filter Ambassadors based on a set of criteria and preferences, including, but not limited to whitelisting or blacklisting individual Ambassadors registered. Furthermore, visual object owners can select Ambassadors that belong to an audience that can be defined in the system.

In other, more detailed features of the invention, the system provides enterprises and institutions the ability to sign up and offer an opt-in program to their employees. Enterprises and institutions must go through a screening process and access to higher tiers of market capitalization visual object owners may be subject to additional levels of approvals. Employees of such enterprises and institutions may go through an attestation process.

In other, more detailed features of the invention, the system provides enterprises and institutions the ability, on behalf of their employees, to pre-filter advertisers based on a set of criteria and preferences, including, but not limited to, whitelisting and or blacklisting visual object owners or industries. Visual object owners and agencies are also able to set frequency, pace, and time duration of their brand to avoid brand fatigue.

Visual Object Owner Costs and Ambassador Reward

In other, more detailed features of the invention, the system tracks the display of visual objects (visual objects impressions). The system charges the visual object owners based on the visual object impressions. The system also rewards the Ambassadors based on the visual object impression generated by them.

In other, more detailed features of the invention, the system supports cost types including, but not limited to, Cost Per Mille (or Cost Per Thousand-CPM), Cost Per Hour (CPH), Cost Per Click (CPC). In the case of CPC, the system enables a call-to-action link. The CPC option can be disabled at the individual, enterprise or institution level.

In other, more detailed features of the invention, the system enables visual object owners to determine the cost type for their visual object impressions.

In other, more detailed features of the invention, the system enables enterprises and institutions to offer monetary compensation from the system as an employee benefit.

In other, more detailed features of the invention, the system provides the ability for individuals, enterprises and institutions to devote any percentage of the revenue to one or more non-profit organizations registered on the system.

In other, more detailed features of the invention, the system provides the ability to securely store accruals to minimize the transaction costs of continuous micropayments.

In other, more detailed features of the invention, the system provides the ability to process payments with alternative native crypto currency.

Integration of the System with the Web Conferencing System

In other, more detailed features of the invention, the system provides a dynamic responsiveness of the virtual camera video stream based on a web conferencing window size.

In other, more detailed features of the invention, the system supports the integration with the web conferencing system to support the scenario where the user turns off the video. In this scenario the video conference system could use the virtual camera stream to replace the user's profile picture in the web conferencing window.

In other, more detailed features of the invention, the web conferencing system account integrates with the system account so that when the Ambassador turns off the video, the web conferencing system could use the system virtual stream in place of the user's profile image or name.

In other, more detailed features, the system displays different visual objects based on the web conferencing session participants' attributes (e.g. title, gender, age, etc.) or geo-location. For example, visual objects of restaurants local to each web conferencing session participant may be displayed in the Ambassador video stream.

In other, more detailed features, the system provides the ability for web conferencing session participants to opt-in to receive promotional emails about the visual objects displayed in the web conferencing session.

Other features of the invention should become apparent from the following description of the preferred embodiments taken in conjunction with the accompanying drawings, which illustrate, by way of example, the principles of the invention.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide systems and methods for generating and displaying user-based visual objects in a live stream during a web conferencing session. One or more visual objects may be generated based on a user's characteristics such as user settings and attributes, topics, content, and subjects discussed in the web conferencing session. The background image (whether real or virtual) used during the web conferencing session may also be analyzed to determine which visual objects to add to the background image and determine a location for placement of the visual objects. The visual object is then dynamically composited into the video stream background of the web conference participant for displaying to the participants on their electronic devices.

Traditional Web Conferencing System

Figure 1:
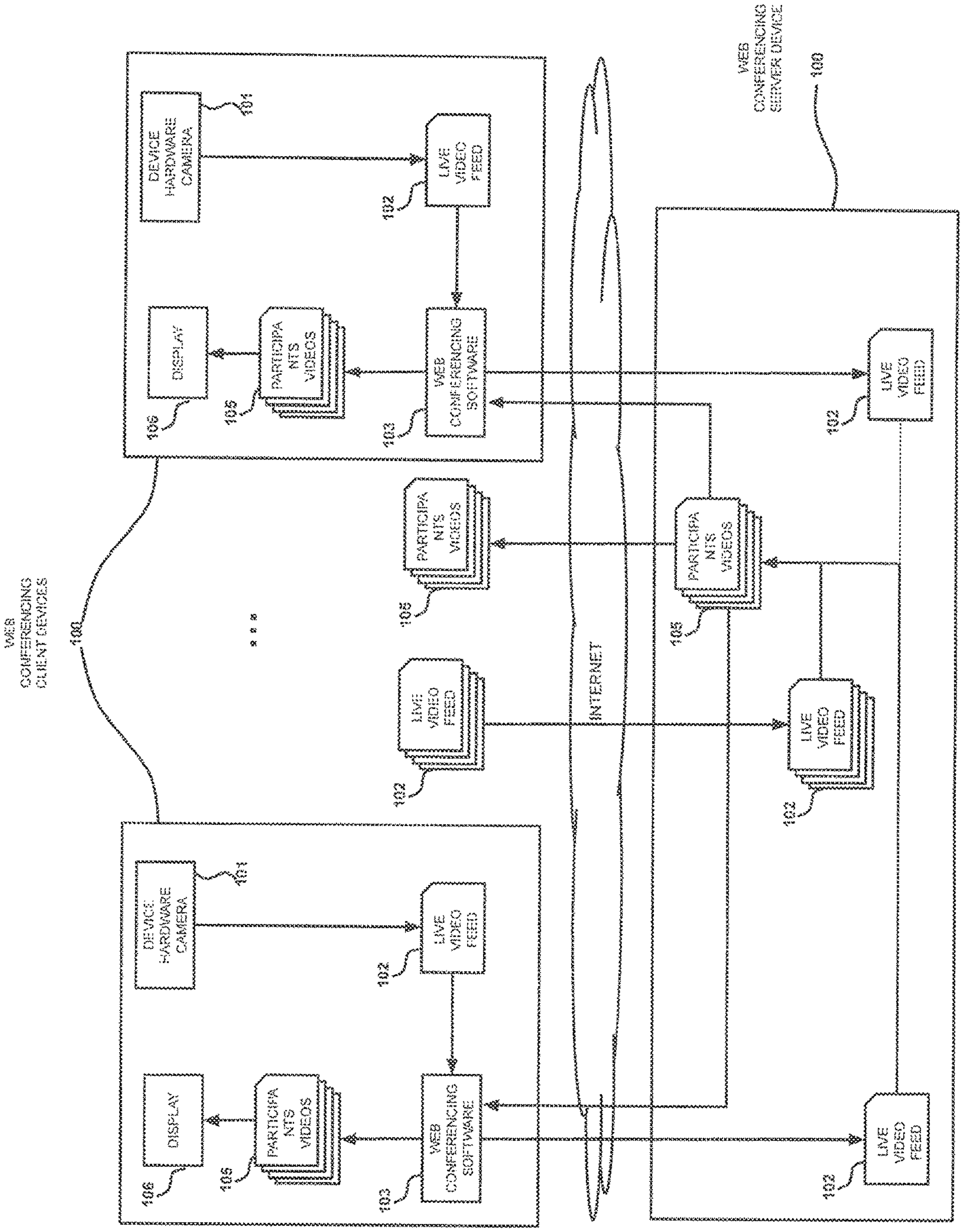
FIG. 1 is a block diagram of a traditional web conferencing system, as known in the art.

FIG. 1 illustrates a block diagram of a web conferencing device 100 with a hardware camera 101 which can generate a live video feed 102 feeding into web conferencing software 103. The web conferencing server device 100 can redistribute all the streams 105 to all web conferencing participants. The web conferencing clients will then display them on their respective displays 106.

Figure 2A:
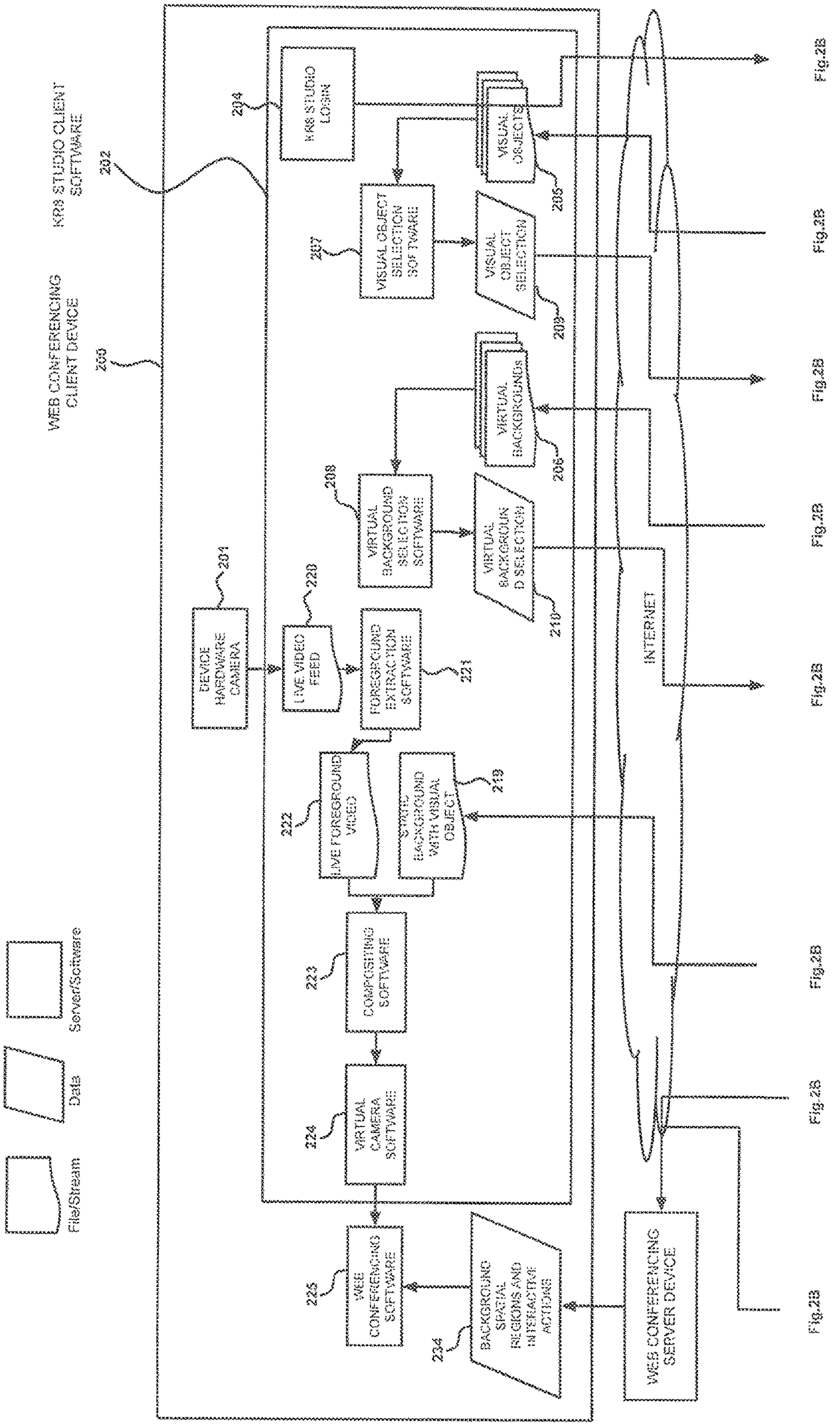
FIGS. 2A and 2B illustrate a block diagram showing client software running in a web conferencing device (e.g. a PC) in a scenario where a visual object is blended into a virtual background with a blending software component running within server side software, according to an embodiment of the invention.
Figure 2B:
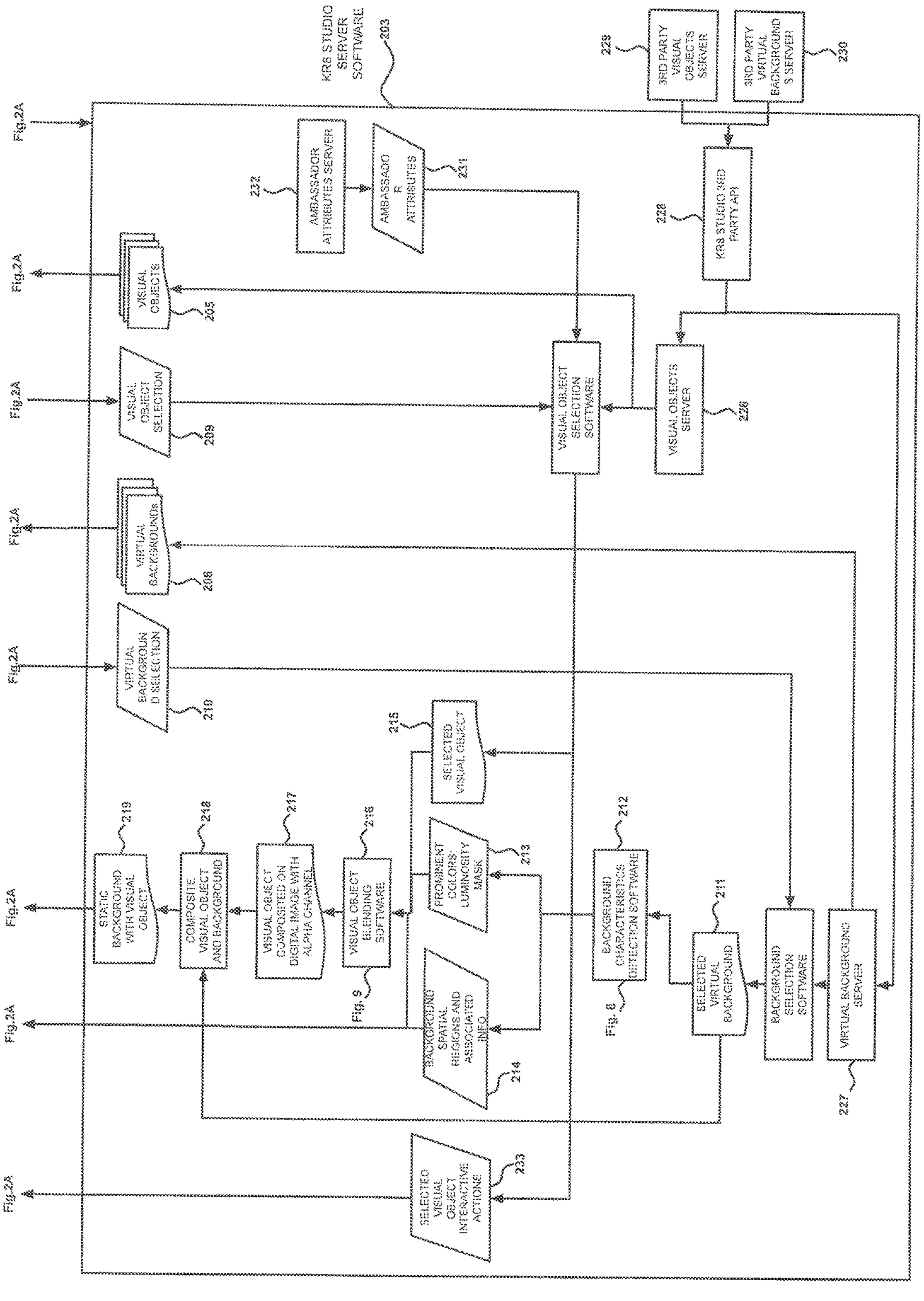

Visual Object Blended into a Virtual Background with Blending Software Running on a Server FIG. 2A and FIG. 2B illustrate a block diagram for blending a visual objection into a virtual background using blending software running on a server, according to one embodiment of the invention. The Web Conferencing device 200 is a computing processing device with or without a hardware video camera 201. In one embodiment, a Kr8 Studio Client software module 202 runs on the Web Conferencing device 200. After an Ambassador logs in 204, the Kr8 Studio Server software 203 through a visual object server 226 updates the visual objects 205 and through its virtual background server 227 updates the virtual backgrounds 206 in the client based on the Ambassador's attributes 231 stored on the Ambassador attributes server 232. The Ambassador then selects the visual object 207 and the virtual background 208, and the selections for each 209 and 210 are sent to the server. The Kr8 Studio Server software 203 then takes the selected virtual background 211 and extracts the background characteristics 212 (see FIG. 8 and its description for details). The generated prominent colors and luminosity mask 213, the background spatial regions and associated information 214, and the selected visual object (SVO) 215 are then passed to the visual object blending software component 216. This software component generates a 2D version of the SVO placed in the appropriate region of the background 217 (see FIG. 9 and its description for details) that is then composited into the selected virtual background 211 by the composite software component 218 generating the status background with the composited SVO 219. This is then passed to the Kr8 Studio Client software 202. This software 202 takes the live video feed 220 from the device hardware camera 201 and using the foreground extraction software component 221 generates the live foreground video 222 that is then composited 223 with the static background with the visual object 219 and passed to the virtual camera software component 224. When the Ambassador selects the Kr8 Studio Virtual Camera in the web conferencing software 225, the live video of the Ambassador with the virtual background and the selected visual objects are displayed to the web conferencing participants.

The Kr8 Studio server software also supports 3rd party visual objects 229 and 3rd party virtual background 230 through the Kr8 Studio 3rd Party API 228.

Each visual object can have an interactive action 233 associated with it. The interactive action 233 defines the visual object behavior and the result of the user's action on that object. When the system is directly integrated with the web conferencing client and/or server, the system transfers the visual object interactive actions associated with each object added to the background and the spatial regions of the object to the web conferencing system 234. When the web conferencing system enables the interactivity in the window where the Ambassador video stream is displayed, the user can click on the visual object and the web conferencing system will execute the behavior and actions associated with that visual object.

Figure 3A:
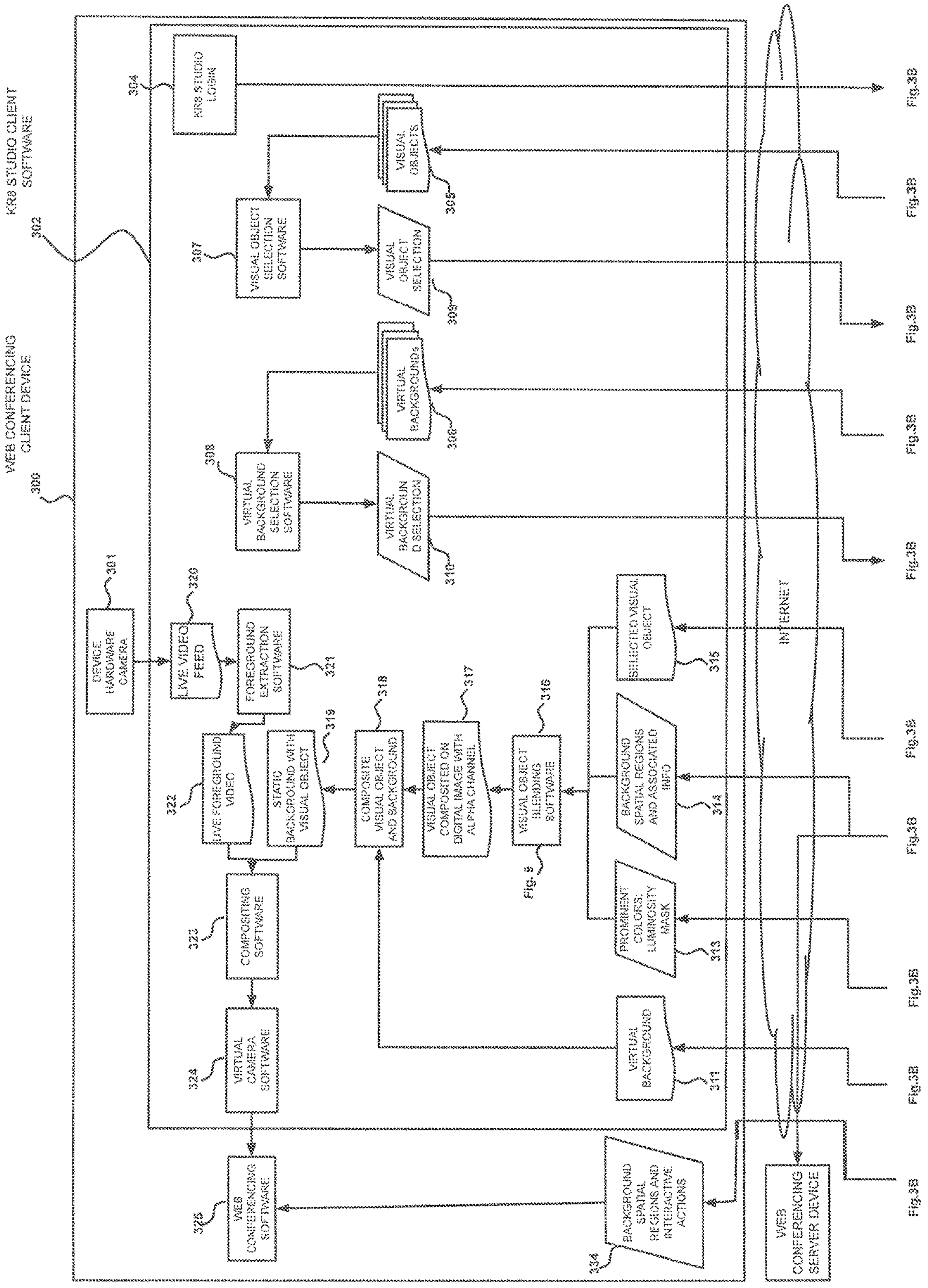
FIGS. 3A and 3B illustrate a block diagram showing the client software running in a web conferencing device (e.g. a PC) in the scenario where the visual object is blended into a virtual background using the blending software component running within the client software, according to an embodiment of the invention.
Figure 3B:
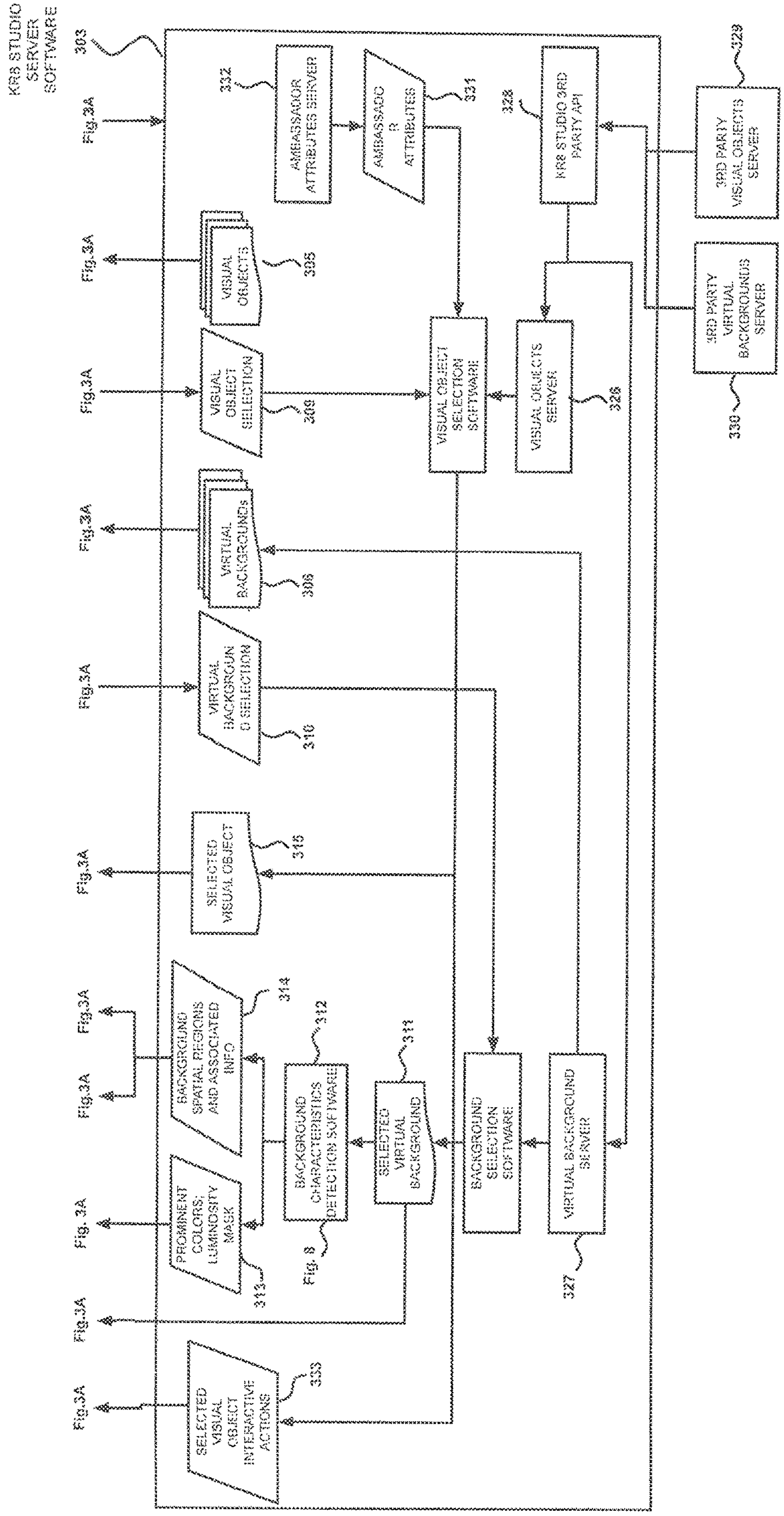

Visual Object Blended into a Virtual Background with Blending Software Running on the Video Conferencing Device FIG. 3A and FIG. 3B illustrate one embodiment of a system and method for blending a visual object into a virtual background with blending software running on a video conferencing device. The Web Conferencing device 300 is a computing processing device with or without a hardware video camera 301. The Kr8 Studio Client software 302 runs on the Web Conferencing device 300. After the Ambassador logs in 304, the Kr8 Studio Server software 303 through its visual object server 326 updates the visual objects 305 and through its virtual background server 327 updates the virtual backgrounds 306 in the client based on the Ambassador's attributes 331 stored on the Ambassador attributes server 332. The Ambassador then selects the visual object 307 and the virtual background 308, and the selections for each 309 and 310 are sent to the server. The Kr8 Studio Server software then takes the selected virtual background 311 and extracts the background characteristics 312 (see FIG. 8 and its description for details). The generated prominent colors and luminosity mask 313, the background spatial regions and associated information 314, and the selected visual object (SVO) 315 are then passed to the visual object blending software component 316 that in this scenario runs in the Web Conferencing device 300. This software generates a 2D version of the SVO placed in the appropriate region of the background 317 (see FIG. 9 and its description for details) that is then composited into the selected virtual background 311 by the composite software component 318 generating the status background with the composited SVO 319. This software that takes the live video feed 320 from the device hardware camera 301 and using the foreground extraction software component 321 generates the live foreground video 322 that is then composited 323 with the static background with the visual object 319 and passed to the virtual camera software component 324. When the Ambassador selects the Kr8 Studio Virtual Camera in the web conferencing software 325 the live video of the Ambassador with the virtual background and the selected visual objects are displayed to the web conferencing participants.

The Kr8 Studio Server software also supports 3rd party visual objects 329 and 3rd party virtual background 330 through the Kr8 Studio 3rd Party API 328.

Each visual object can have an interactive action 333 associated with it. The interactive action 333 defines the visual object behavior and the result of the user's action on that object. When the system is directly integrated with the web conferencing client and/or server, the system transfers the visual object interactive actions associated with each object added to the background and the spatial regions of the object to the web conferencing system 334. When the web conferencing system enables the interactivity in the window where the Ambassador video stream is displayed, the user can click on the visual object and the web conferencing system will execute the behavior and actions associated with that visual object.

Figure 4A:
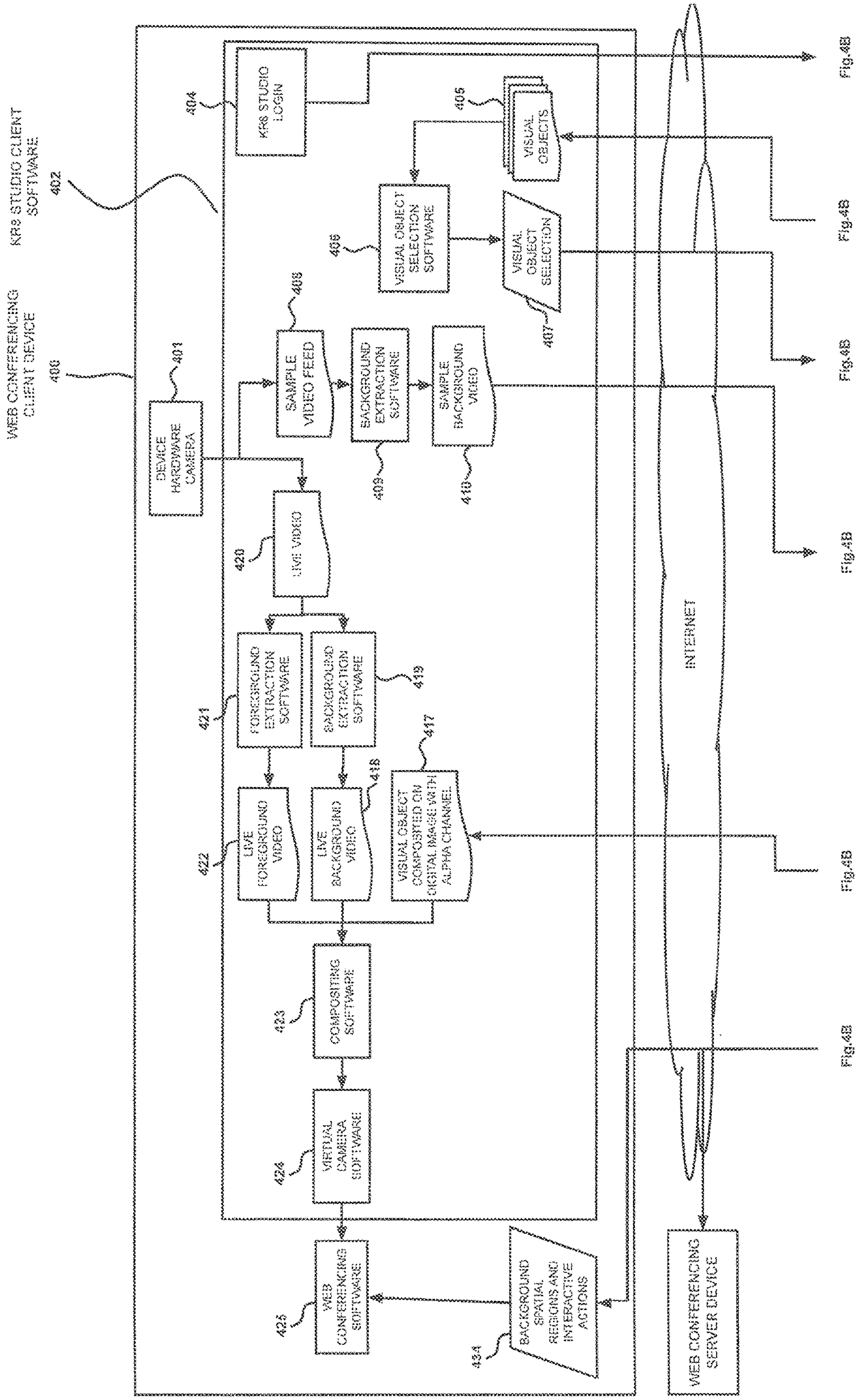
FIGS. 4A and 4B illustrate a block diagram showing the client software running in a web conferencing device (e.g. a PC) in the scenario where the visual object is blended into the live feed background with the blending software running on a server side software, according to an embodiment of the invention.
Figure 4B:
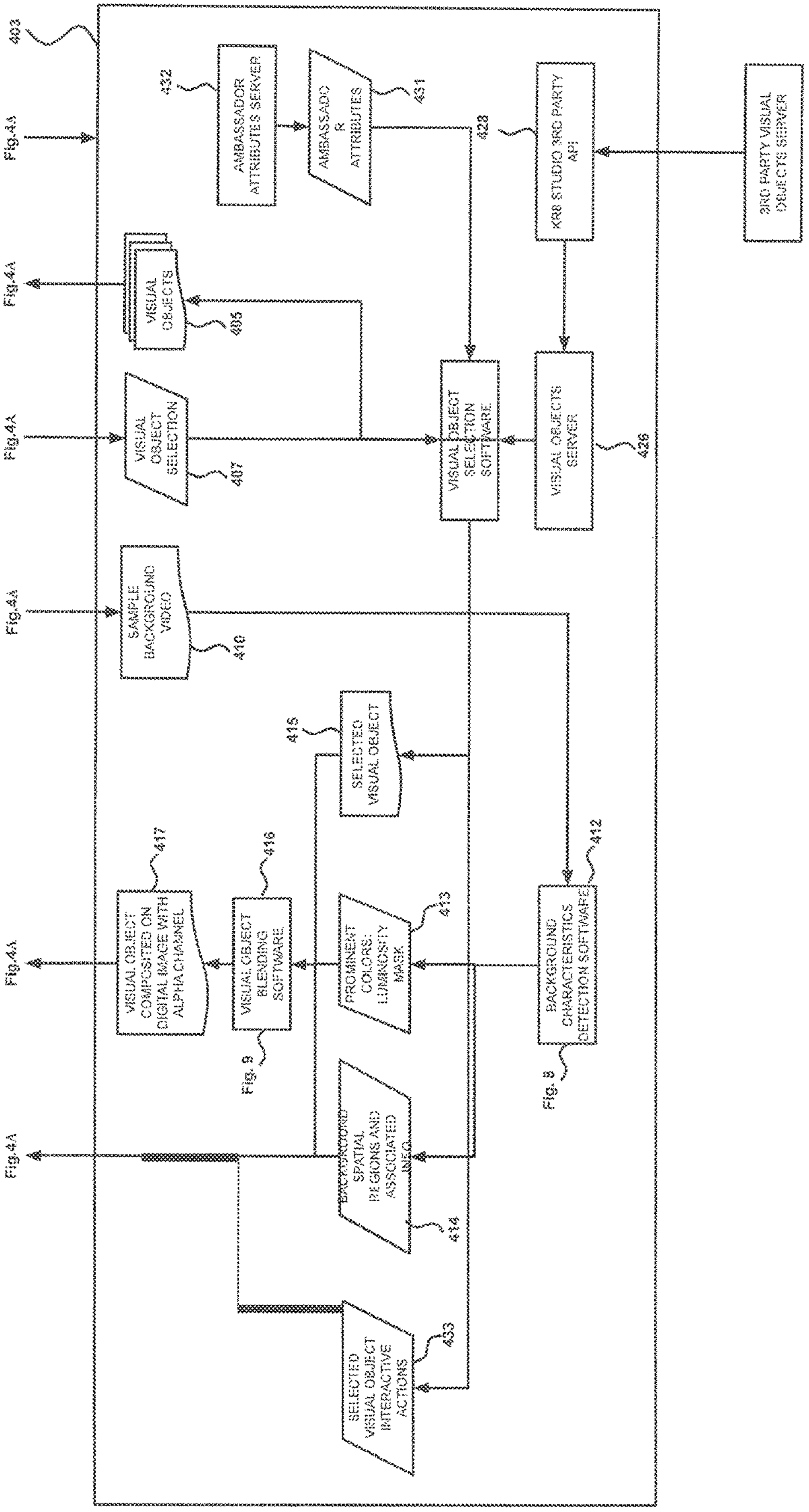

Visual Object Blended into the Background of the Live Feed with Blending Software Running on a Server FIG. 4A and FIG. 4B illustrate a system and method for blending a visual object into the background of a live feed with blending software running on a server. The Web Conferencing device 400 is a computing processing device with or without a hardware video camera 401. The Kr8 Studio Client software 402 runs on the Web Conferencing device. After the Ambassador logs in 404, the Kr8 Studio Server software 403 through its visual object server 426 updates the visual objects 405 in the client based on the Ambassador's attributes 431 stored on the Ambassador attributes server 432. The Ambassador then selects the visual object 406, and the selection 407 is sent to the server. The Kr8 Studio Client software 402 captures a few seconds of the video feed 408, and runs the background extraction software component 409 generating a sample background video 410 that is sent to the Kr8 Studio Server software 403. The Kr8 Studio Server software 403 then takes the sample background video 410 and extracts the background characteristics 412 (see FIG. 8 and its description for details). The generated prominent colors and luminosity mask 413, the background spatial regions and associated information 414, and the selected visual object (SVO) 415 are then passed to the visual object blending software component 416. This software component generates a 2D version of the SVO placed in the appropriate region of the background 417 (see FIG. 9 and its description for details) and it is passed to the Kr8 Studio Client software 402. This software takes the live video feed 420 from the device hardware camera 401 and, using the foreground extraction software component 421, generates the live foreground video 422, then, using the background extraction software component 419, extracts the live background video 418. The live foreground video, the live background video and the 2D version of the SVO 417 are composited 423 and passed to the virtual camera software component 424. When the Ambassador selects the Kr8 Studio Virtual Camera in the web conferencing software 425 the live video of the Ambassador with the virtual background and the selected visual objects are displayed to the web conferencing participants.

The Kr8 Studio Server software 403 also supports 3rd party visual objects 429 and 3rd party virtual background 430 through the Kr8 Studio 3rd Party API 428.

Each visual object can have an interactive action 433 associated with it. The interactive action 433 defines the visual object behavior and the result of the user's action on that object. When the system is directly integrated with the web conferencing client and/or server, the system transfers the visual object interactive actions associated with each object added to the background and the spatial regions of the object to the web conferencing system 434. When the web conferencing system enables the interactivity in the window where the Ambassador video stream is displayed, the user can click on the visual object and the web conferencing system will execute the behavior and actions associated with that visual object.

Figure 5A:
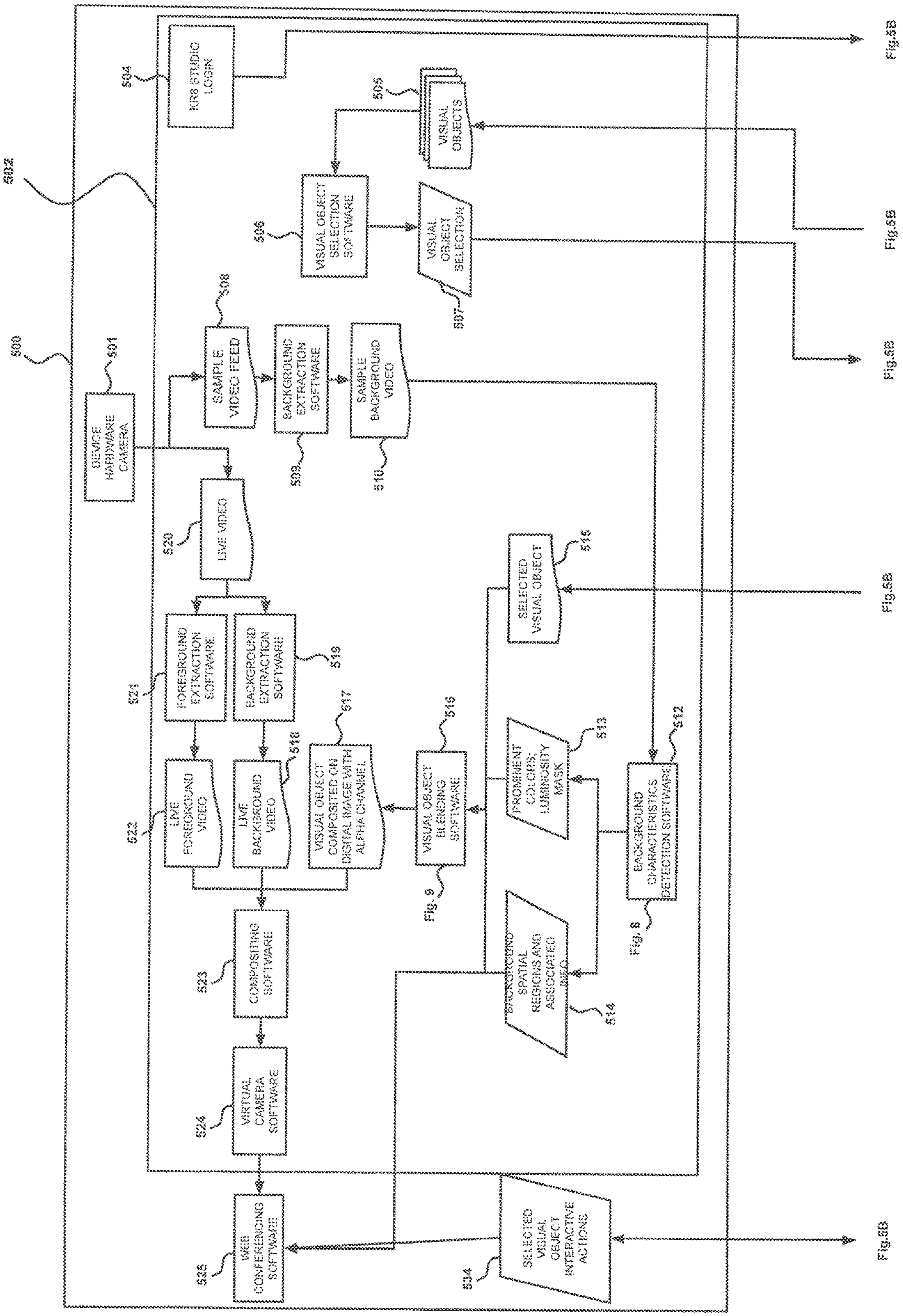
FIGS. 5A and 5B illustrate a block diagram showing the client software running in a web conferencing device (e.g. a PC) in the scenario where the visual object is blended into the live feed background using the blending software component running within the client software, according to an embodiment of the invention.
Figure 5B:
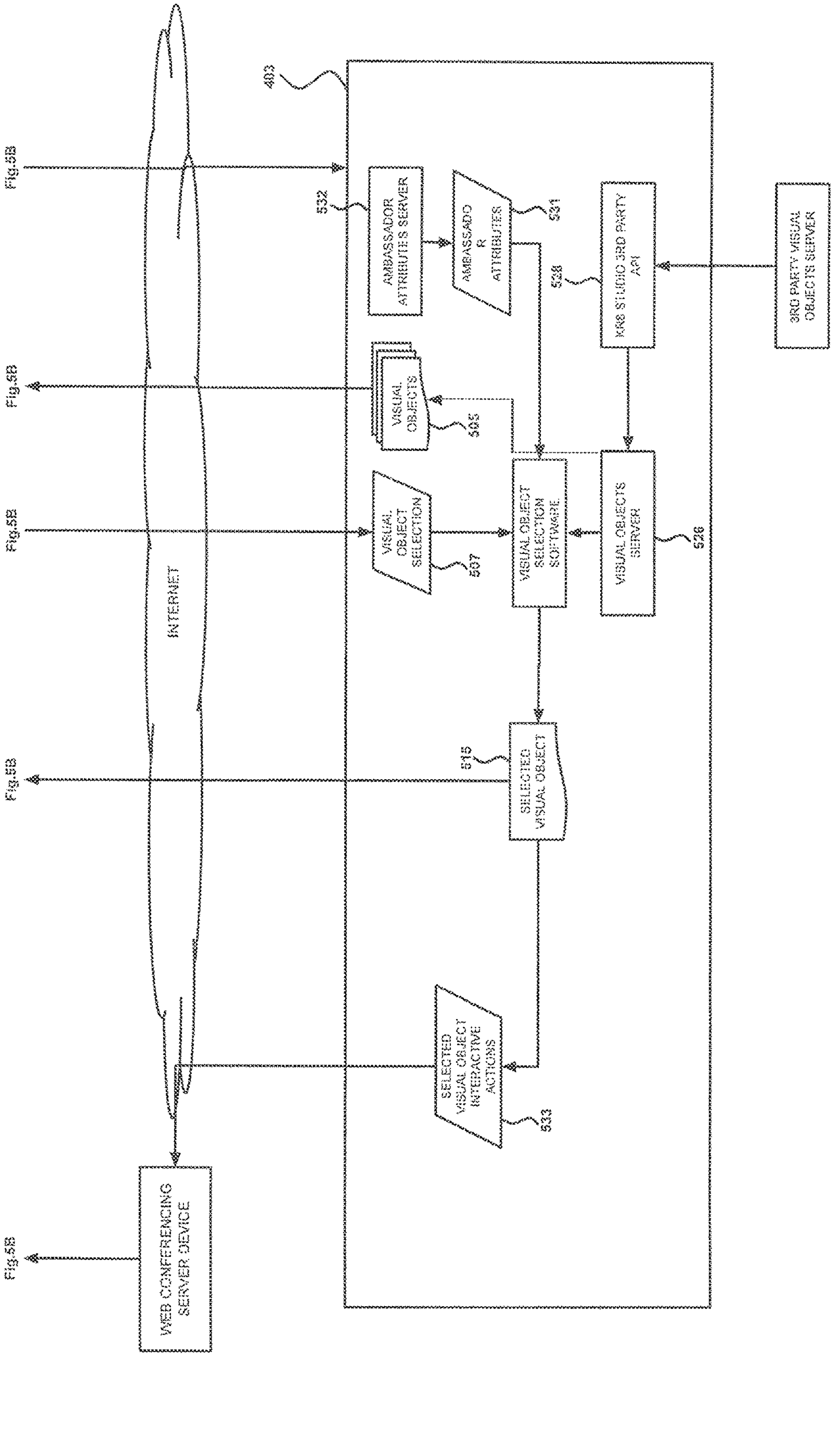

Visual Object Blended into the Background of the Live Feed with Blending Software Running on the Video Conferencing Device FIG. 5A and FIG. 5B illustrate one embodiment of a system and method for blending a visual object into a background of a live feed with blending software running on a video conferencing device. The Web Conferencing device 500 is a computing processing device with or without a hardware video camera 501. The Kr8 Studio Client software 502 runs on the Web Conferencing device. After the Ambassador logs in 504, the Kr8 Studio Server software 503 through its visual object server 526 updates the visual objects 505 in the client based on the Ambassador's attributes 531 stored on the Ambassador attributes server 532. The Ambassador then selects the visual object 506, and the selection 507 is sent to the server. The Kr8 Studio Client software 502 captures a few seconds of the video feed 508, and runs the background extraction software component 509 generating a sample background video 510. The Kr8 Studio Server software 503 then takes the sample background video 510 and extracts the background characteristics 512 (see FIG. 8 and its description for details) that in this scenario runs in the Kr8 Studio Client software 502. The generated prominent colors and luminosity mask 513, the background spatial regions and associated information 514, and the selected visual object (SVO) 515 are then passed to the visual object blending software component 516. This software component generates a 2D version of the SVO placed in the appropriate region of the background 517 (see FIG. 9 and its description for details) and it is passed to the Kr8 Studio Client software. This software takes the live video feed 520 from the device hardware camera 501 and, using the foreground extraction software component 521, generates the live foreground video 522, then, using the background extraction software component 519, extracts the live background video 518. The live foreground video, the live background video and the 2D version of the SVO 517 are composited 523 and passed to the virtual camera software component 524. When the Ambassador selects the Kr8 Studio Virtual Camera in the web conferencing software 525 the live video of the Ambassador with the virtual background and the selected visual objects are displayed to the web conferencing participants.

The Kr8 Studio Server software 503 also supports 3rd party visual objects 529 and 3rd party virtual background 530 through the Kr8 Studio 3rd Party API 528.

Each visual object can have an interactive action 533 associated with it. The interactive action 533 defines the visual object behavior and the result of the user's action on that object. When the system is directly integrated with the web conferencing client and/or server, the system transfers the visual object interactive actions associated with each object added to the background and the spatial regions of the object to the web conferencing system 534. When the web conferencing system enables the interactivity in the window where the Ambassador video stream is displayed, the user can click on the visual object and the web conferencing system will execute the behavior and actions associated with that visual object.

Visual Object Exposure Measurement

Figure 6:
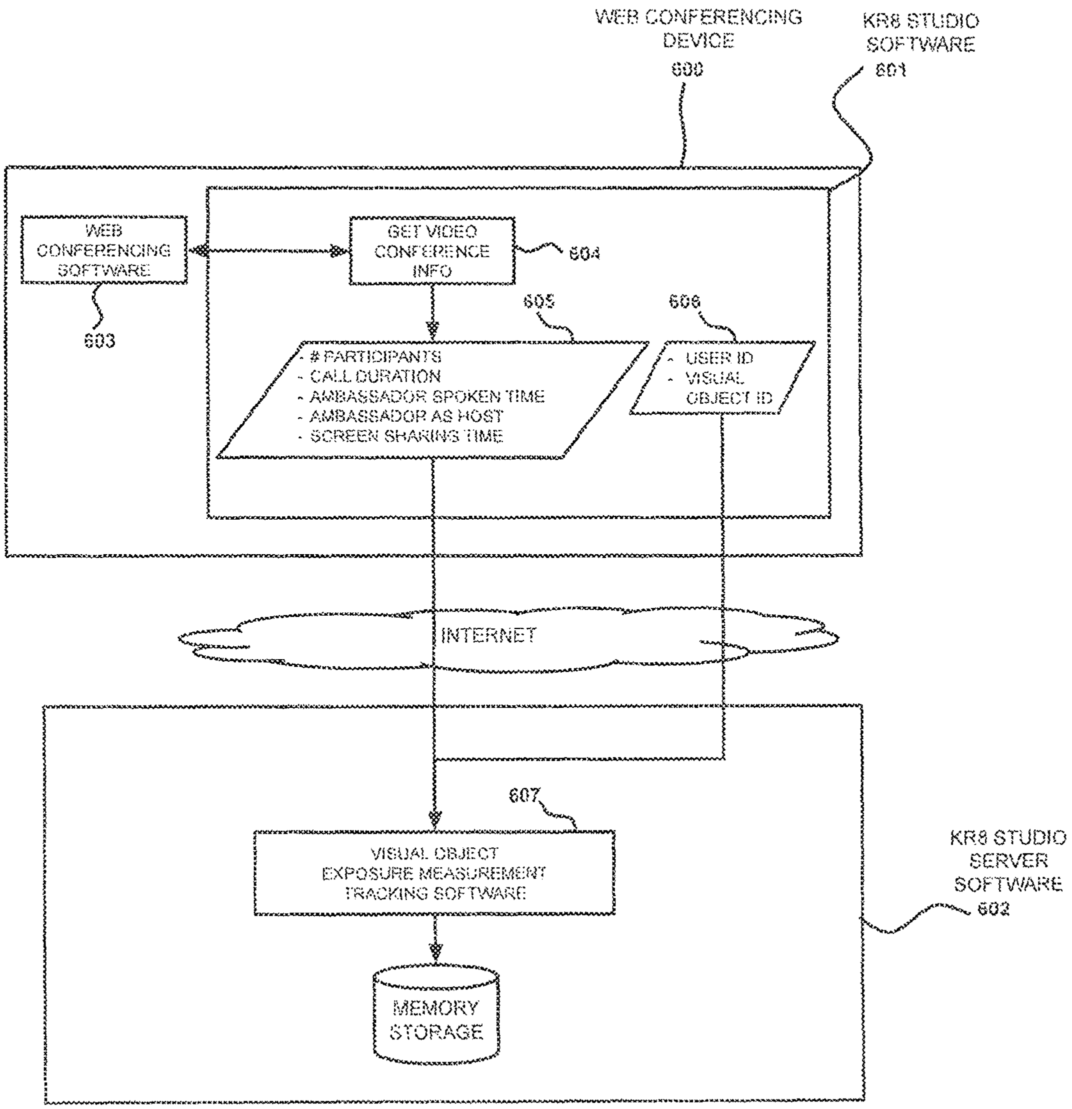
FIG. 6 is a block diagram showing the client software running in a web conferencing device (e.g. a PC) and interacting with the web conferencing software to obtain information like the number of participants and the duration of the web conferencing session, according to an embodiment of the invention.

In one embodiment illustrated in FIG. 6, the Kr8 Studio Client software 601 runs on the Web Conferencing device 600 and makes a request 604 to the web conferencing software 603 to get information about the web conferencing session: the number of participants, the session duration, the Ambassador spoken time, whether the Ambassador was the host of the session, the screen sharing time, etc. 605. The Kr8 Studio Client software 601 takes this information along with the Ambassador user ID, and the Ambassador selected visual object (SVO) ID 606, and sends it to the Kr8 Studio Client software 602. The visual object exposure measurement tracking software component 607 takes the data and stores it for future analysis.

Method of Generating and Inserting the Visual Object

Figure 7A:
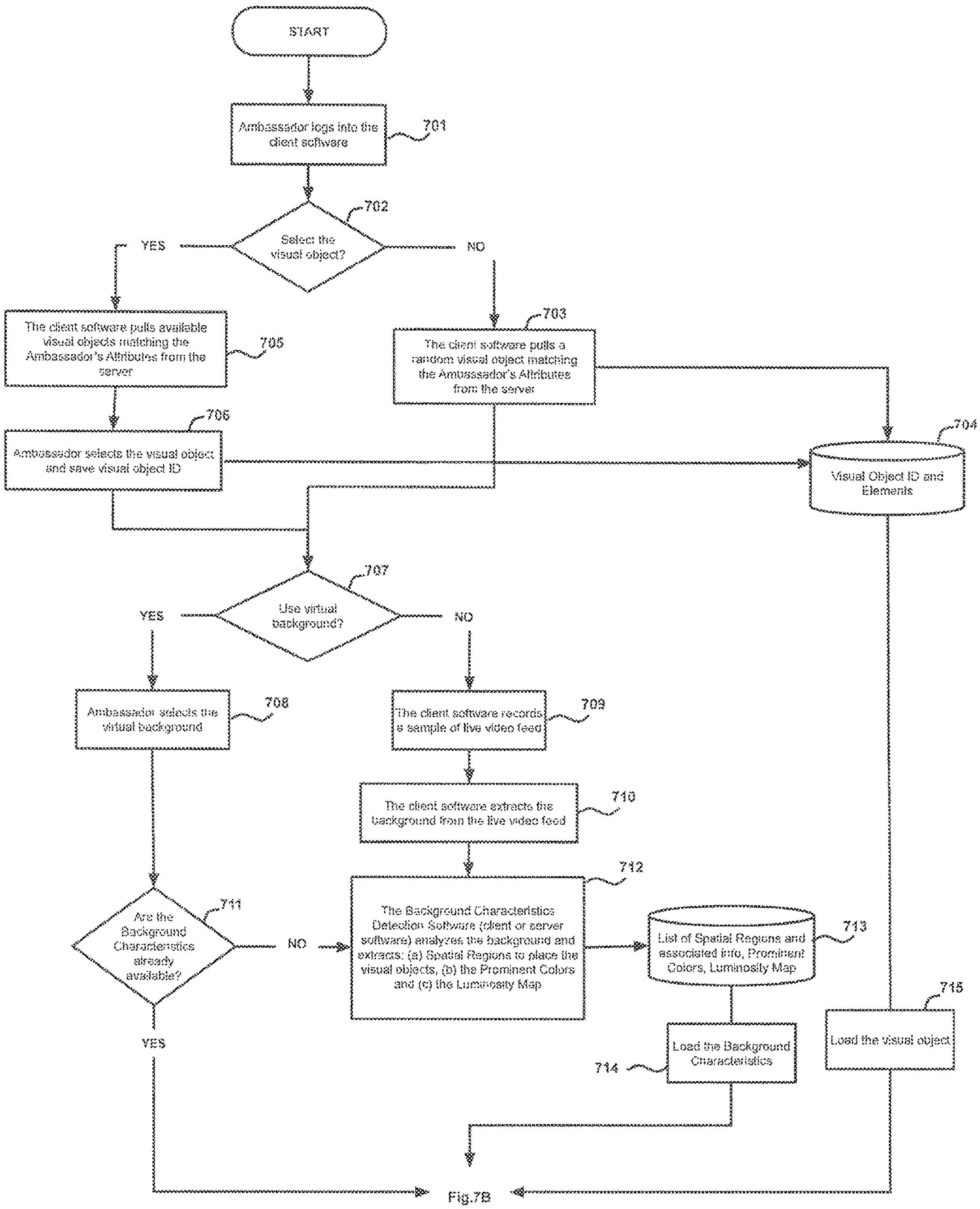
FIGS. 7A and 7B illustrate a flowchart diagram showing the steps taken by the Ambassador using the client software; how the visual object is blended in the Ambassador's video stream; and how the video stream is then transferred to the web conferencing software, according to an embodiment of the invention.
Figure 7B:
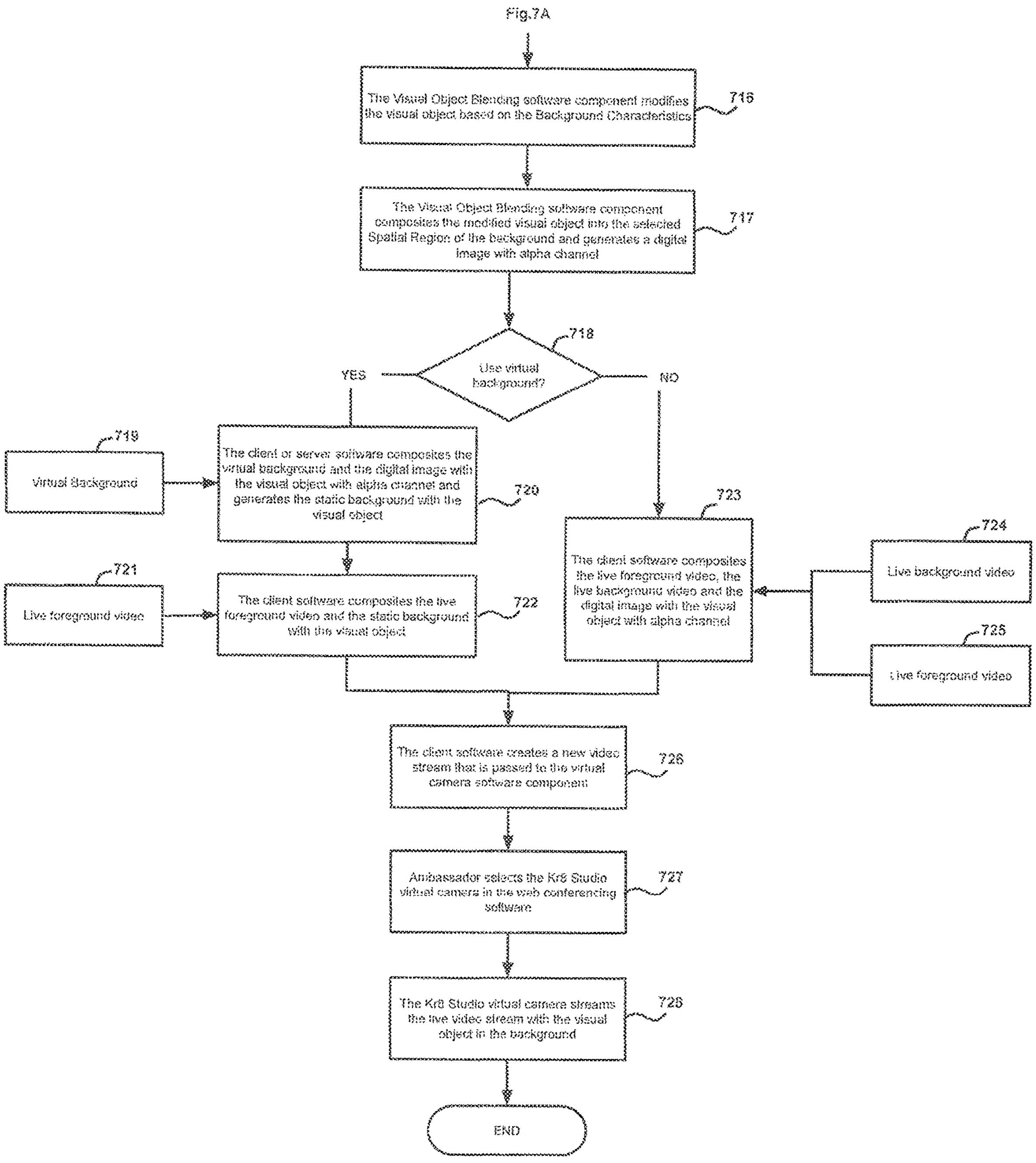

FIG. 7A and FIG. 7B illustrate one embodiment of a method of generating and inserting a visual object. The Ambassador launches the client software and logs into their account 701. The software checks the Ambassador's settings for whether the Ambassador prefers to select a visual object 702. If the setting is set for a random selection, then the software pulls a random visual object that matches the Ambassador's Attributes 703 and saves the visual object ID and its visual elements 704. If the setting is set for the Ambassador to select the visual object, the software pulls the list of visual objects matching the Ambassador's Attributes 705, displays the visual objects and allows the Ambassador to select the preferred visual object 706 and saves the visual object ID and its elements 704. Then the software checks the settings for whether a virtual background should be used 707. The Ambassador selects a virtual background 708. If the Background Characteristics have not been extracted from the virtual background 711 then the software extracts the background characteristics: (a) Spatial Regions where the visual objects can be placed, (b) the Prominent Colors, and (c) the Luminosity Map 712 and saves them 713. If Ambassador prefers using the background from the video stream (Ambassador prefers not using a virtual background) 707, then the software captures a sample of the video stream 709, extracts the background 710 and the Background Characteristics 712, and saves them 713. At this point the software loads the Background Characteristics 714, and the visual object 715, and passes them to the Blending software component that modifies the visual object based on the Background Characteristics 716. The Blending software component then composites the visual object into the selected Spatial Region of the background and generates a digital image with an alpha channel around the visual object 717. If the Ambassador selected the virtual background 718, then the software composites the virtual background 719 and the digital image with the visual object 720. The newly generated static background with the visual object is then passed to the client software component 722 that composites it with the live foreground video 721.

If the Ambassador preferred using the background from the video stream (Ambassador preferred not using a virtual background) 718, then the client software composites 723 the live background video 724 and the digital image with the visual object using the alpha channel, and then composites the live foreground video 725.

In either virtual background or live background video scenarios, the client software creates a new video stream and transfers it to a virtual camera software component 726.

When the Ambassador launches the web conferencing software and selects the system's virtual camera 727, the new video stream with the visual object in the background is streamed through the web conferencing software 728.

Background Characteristics Detection Software

Figure 8:
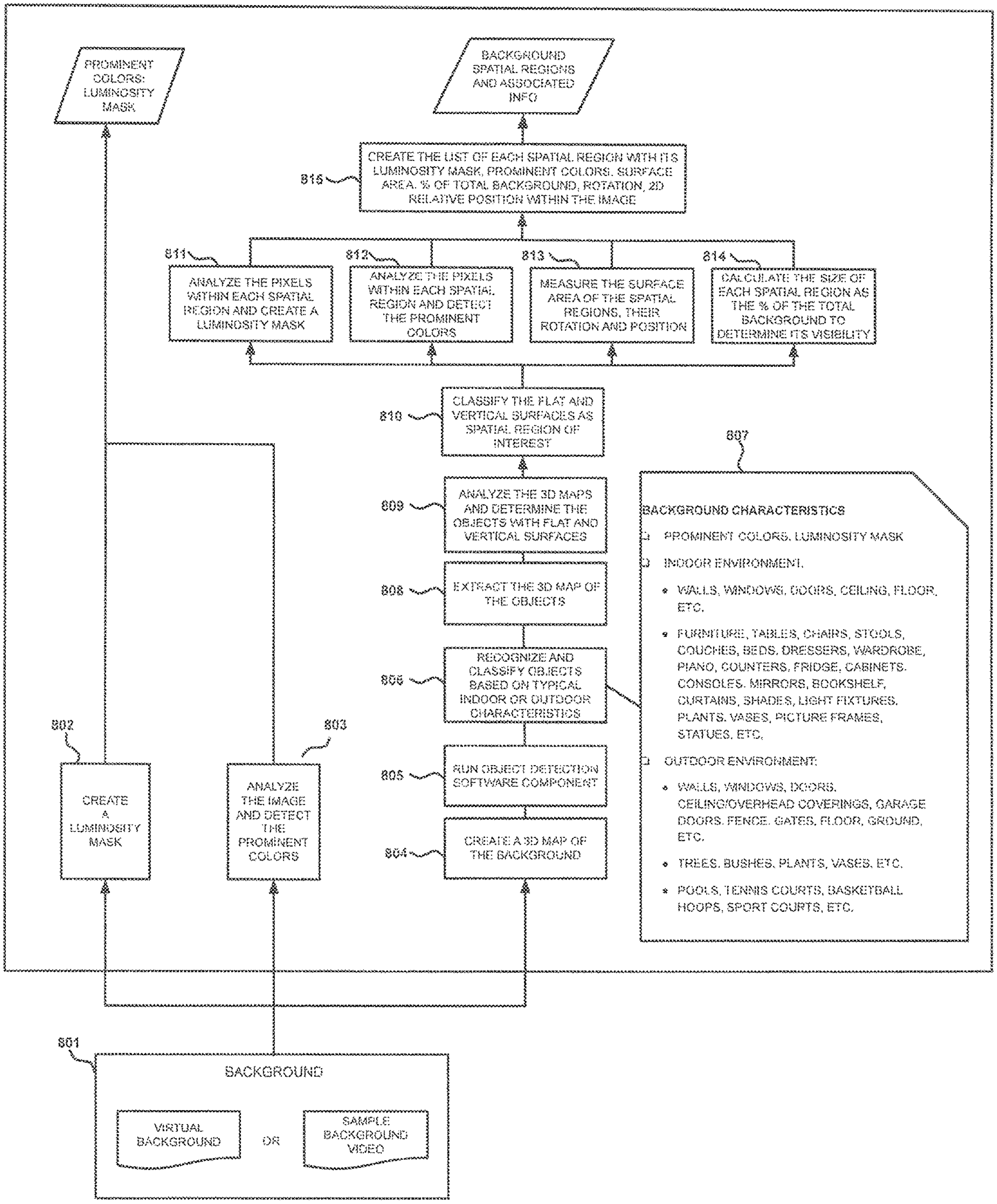
FIG. 8 is a flowchart diagram of a Background Characteristics Detection software component showing the steps taken to analyze the background, extract prominent colors and a luminosity map, and determine the spatial regions where the visual object could be composited on, according to an embodiment of the invention.

FIG. 8 illustrates one embodiment of a method of detecting background characteristics. The Ambassador selects a virtual background or the live background video 801. The software analyzes a selected background and creates a luminosity mask 802, then detects and extracts prominent colors 803. The software then performs a volumetric analysis of the background and creates a 3D map 804. The software then runs the object detection software 805, extracts objects 806 and classifies them 807. The software then extracts the 3D map of the found objects 808 and analyzes the objects and their characteristics (e.g. flat surfaces, size as a percentage of the overall background, position based on the foreground/user, etc.) 809. Based on the characteristics, the software then classifies the objects and prioritizes them as potential spatial regions of interest (SRI) on which to render the virtual images 810. The software then analyzes the SRIs and creates the luminosity map 811 and the prominent colors 812. The software also measures the surface area of each SRI, their rotations and position 813; and it calculates each SRI's area as a percentage of the total background in order to determine its visibility 814. The software then creates a list of each SRI with its associated information 815. This information along with the background's prominent colors and luminosity mask will be passed to the software component that invoked the Background Characteristics Detection Software.

Visual Object Blending Software

Figure 9:
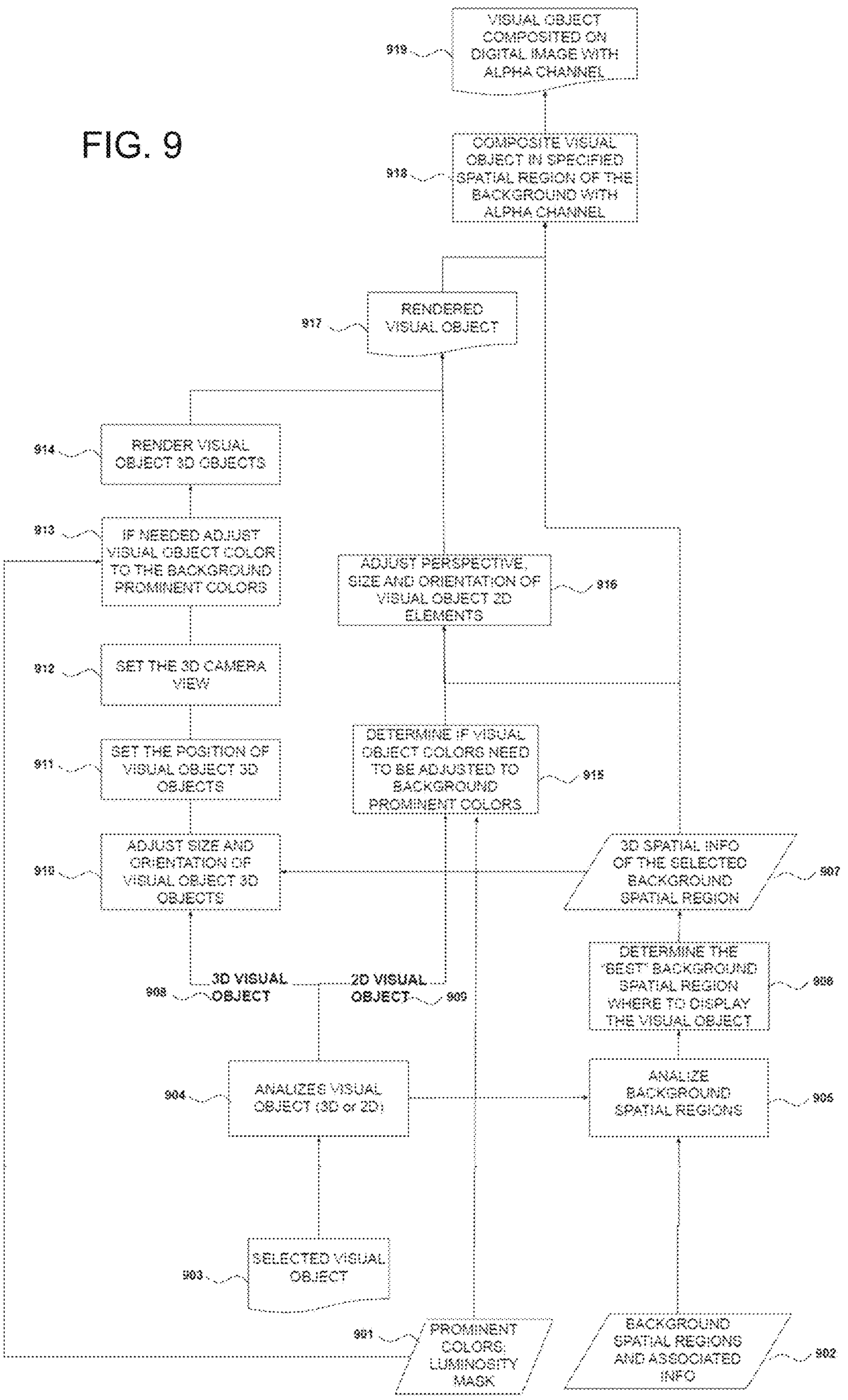
FIG. 9 is a flowchart diagram of the Blending software component showing the steps taken to determine the best spatial region of the background to composite the visual object, modify the 2D or the 3D visual object based on the spatial region and background characteristics, and then composite the visual object on a digital image with an alpha channel, which enables displaying the visual object on either the virtual background or the live background video, according to an embodiment of the invention.

FIG. 9 illustrates one embodiment of a method of blending visual objects using the visual objects blending software module. This software component receives the background's prominent colors and luminosity mask 901, the spatial regions of interest (SRI) and their associated information (size, rotation, position in the 3D background space, size, and size percentage as compared to the background space) 902.

The software also receives as input the selected visual object (SVO) 903.

The software analyzes SVO characteristics (color, minimum size, rotation) 904 and the list of SRIs 905, then determines the "best" SRI to render the SVO 906 and defines the selected SRI 907.

If the SVO is a 3D object 908, the software will adjust the size and orientation of the SVO based on the selected SRI 910, set a position of the adjusted SVO in the 3D background space 911, position the 3D camera 912, adjusts the SVO color to match/be compatible with the background (if needed) 913, and then render the SVO 914 generating the rendered SVO 917.

If the SVO is a 2D object 909, the software adjusts the SVO colors to match/be compatible to the background (if needed) 915, adjust the perspective, size and orientation of the SVO based on the selected SRI 916, and then generate the rendered SVO 917.

The rendered SVO is then composited in the selected SRI of the background 918, generating a 2D image with an alpha channel 919 that it then transferred to the software that invoked the Visual Object Blending Software.

Figure 10:
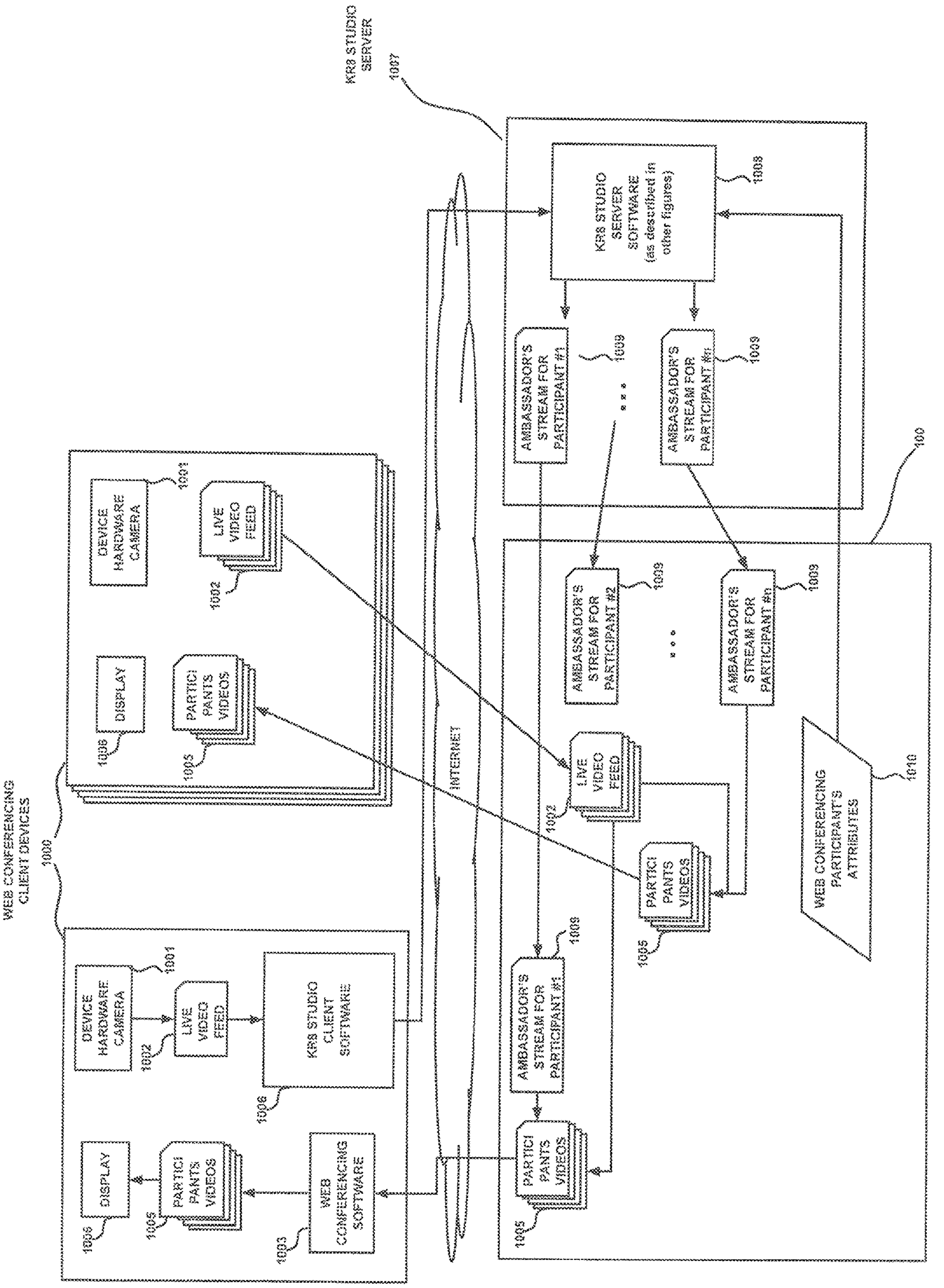
FIG. 10 is a block diagram illustrating a web conferencing experience showing a web conferencing session with a total of 9 participants, of whom 5 are Ambassadors, according to an embodiment of the invention.

Personalized Visual Object and Background Based on Participant's Attributes Visual Object Blending Software FIG. 10 illustrates a web conferencing experience showing a web conferencing session with a total of 9 participants, of whom 5 are Ambassadors. When the system is directly integrated with the web conferencing server 100, the Ambassador's video stream can be personalized for each web conferencing participant based on their attributes. The participant's attributes would determine their identity, interests, geographical location, etc. These attributes would determine the specific visual objects that would be blended on the Ambassador's background creating a unique and personalized video stream for each participant. The participant's attributes could also determine the selection of the virtual background that is added to the Ambassador's video stream. Each personalized video stream of the Ambassador is sent to the web conferencing system that will then redistribute to each participant's web conferencing system client.

The system works like for the other scenario with the difference that the Kr8 Studio Server software 1008 generates multiple personalized streams of Ambassador's for each of the participants 1009 based on the participants' attributes 1010 that the web conferencing system provides to the Kr8 Studio system. The personalized streams 1009 are then transferred to the web conferencing server system 100 that distributes them to each participant.

Computer-Enabled Embodiment

Figure 11:
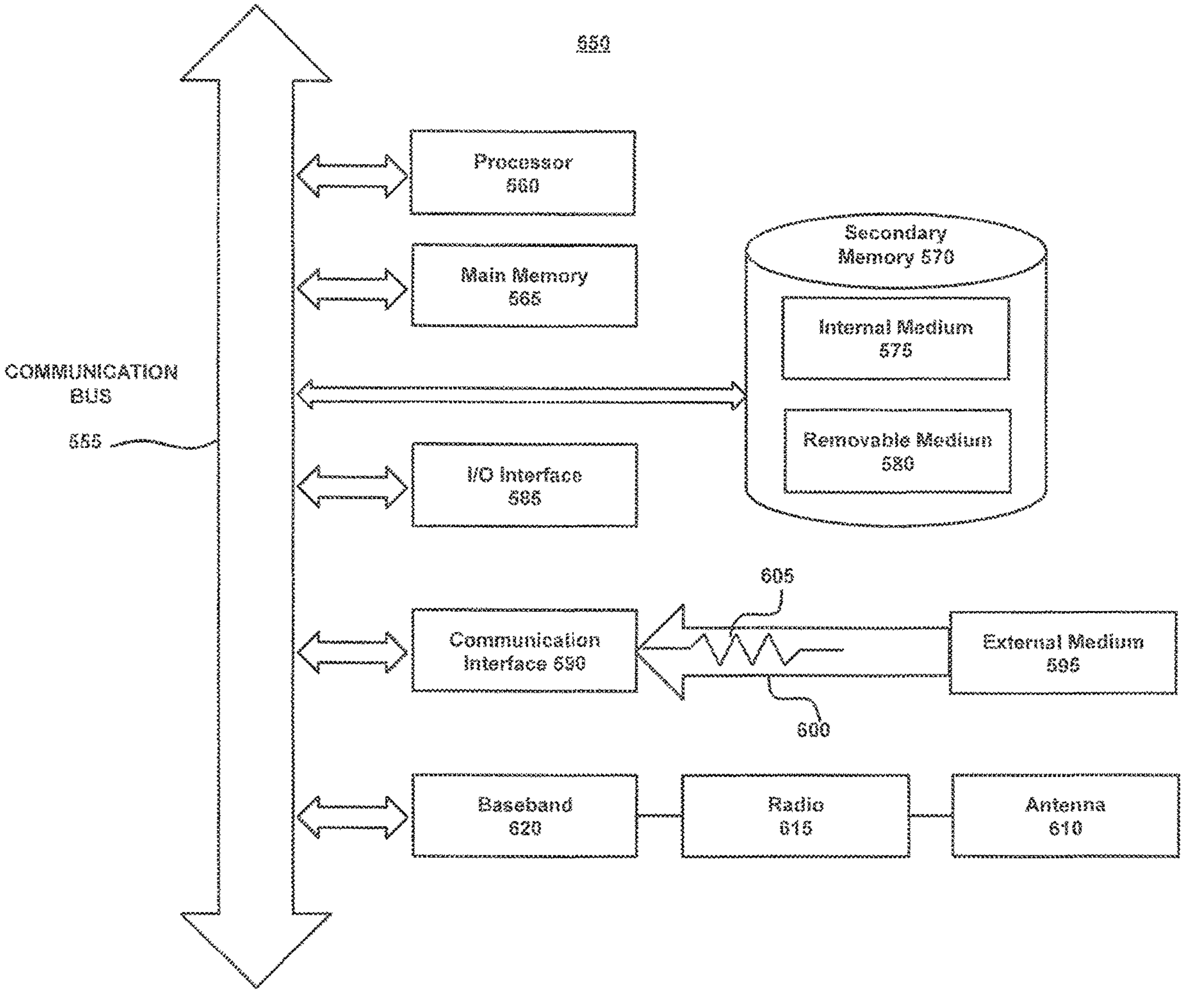
FIG. 11 is a block diagram illustrating an example wired or wireless processor enabled device that may be used in connection with various embodiments described herein.

FIG. 11 is a block diagram illustrating an example wired or wireless system 550 that may be used in connection with various embodiments described herein. For example, the system 550 may be used as or in conjunction with the system for generating and displaying visual objects as previously described with respect to FIGS. 1-10. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for integrating personalized visual objects into a video stream during an online meeting, comprising:

at least one meeting host device with an image capture component for capturing at least one image of a meeting host; and at least one meeting participant device with a display component for displaying the at least one image of the meeting host to the meeting participant;

a meeting server which communicates between the at least one meeting host device and the at least one meeting participant device to host the online meeting; and a visual object database and application server which generates and inserts at least one visual object into the video stream of the online meeting to display on the display screen of the at least one meeting participant device, wherein the at least one visual object is generated for each meeting participant device based on attributes of each meeting participant.

2. The system of claim 1, wherein the at least one visual object is generated based on the attributes of the meeting host.

3. The system of claim 1, wherein the visual objects are inserted into a background image of the online meeting.

4. The system of claim 1, wherein the visual objects may be one or more of: a video, an animation, a set of digital images (GIFs), a single digital image, a QR code, 2-dimensional SVGs or 3-dimensional digital objects.

5. The system of claim 1, wherein the visual objects are selected based on visual characteristics of a background image in the online meeting.

6. The system of claim 1, further comprising a virtual camera which generates a video stream with a background image for the meeting host in conjunction with the visual objects.

7. The system of claim 1, wherein the user can interact with the visual objects.

8. A method for generating user-based visual objects in a web conferencing application, the method comprising the steps of:

identifying a plurality of attributes of a host of a web conferencing session; and generating at least one visual object based on the plurality of attributes of the host;

inserting the at least one visual object into the virtual background during a live web conferencing session; and displaying the virtual background and the at least one visual object to at least one meeting participant on a display device.

9. The method of claim 8, further comprising generating the at least one visual object for each meeting participant device based on attributes of each meeting participant.

10. The method of claim 8, wherein the visual objects may be one or more of: a video, an animation, a set of digital images (GIFs), a single digital image, a QR code, 2-dimensional SVGs or 3-dimensional digital objects.

11. The method of claim 8, further comprising generating the at least one visual object based on visual characteristics of a background image in the online meeting.

12. The method of claim 8, wherein the attributes of the host may include one or more of: user settings and attributes, topics, content, and subjects discussed in the web conferencing session.

13. The method of claim 8, further comprising displaying the virtual background and the at least one visual object to at least one meeting participant on a display device for a predetermined frequency, pace or duration in accordance with attributes of the host or a visual object owner.

14. The method of claim 8, further comprising analyzing the effectiveness of the visual objects with regard to interaction by the meeting participants.

* * * * *